United States Patent
Strauch et al.

(10) Patent No.: US 11,044,679 B2
(45) Date of Patent: Jun. 22, 2021

(54) DEVICES, SYSTEMS AND METHODS FOR EXTENDING THE RANGE OF A WIRELESS COMMUNICATION SYSTEM

(71) Applicant: Cypress Semiconductor Corporation, San Jose, CA (US)

(72) Inventors: Paul Strauch, Pleasanton, CA (US); Ayush Sood, Bangalore (IN); Kiran Uln, Pleasanton, CA (US); Kamesh Medapalli, San Jose, CA (US); Prasanna Kumar Sethuraman, Bangalore (IN); Rajendra Kumar Gundu Rao, Bangalore (IN); Saishankar Nandagopalan, San Diego, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/366,668

(22) Filed: Mar. 27, 2019

(65) Prior Publication Data
US 2020/0314767 A1   Oct. 1, 2020

(51) Int. Cl.
*H04W 52/32* (2009.01)
*H04W 8/00* (2009.01)
*H04W 72/04* (2009.01)
*H04L 5/00* (2006.01)
*H04W 88/08* (2009.01)
*H04W 84/12* (2009.01)

(52) U.S. Cl.
CPC ......... *H04W 52/322* (2013.01); *H04L 5/0012* (2013.01); *H04W 8/005* (2013.01); *H04W 72/0453* (2013.01); *H04W 84/12* (2013.01); *H04W 88/08* (2013.01)

(58) Field of Classification Search
CPC .......... H04W 36/0022; H04W 52/367; H04W 76/068; H04W 52/322; H04W 8/005; H04W 72/0453; H04L 5/0012
USPC ......................................................... 370/338
See application file for complete search history.

(56) References Cited

U.S. PATENT DOCUMENTS

| 2011/0045875 | A1* | 2/2011 | Rhee | H04W 52/0216 455/574 |
| 2011/0134889 | A1 | 6/2011 | Harvey et al. | |
| 2013/0195036 | A1* | 8/2013 | Quan | H04W 72/085 370/329 |
| 2016/0021601 | A1* | 1/2016 | Zhang | H04W 48/12 455/434 |
| 2017/0019891 | A1 | 1/2017 | Rong et al. | |
| 2017/0332286 | A1* | 11/2017 | Lepp | H04W 72/1252 |

(Continued)

OTHER PUBLICATIONS

International Search Report for International Application No. PCT/US20/14903 dated Apr. 16, 2020; 2 pages.

(Continued)

*Primary Examiner* — Faisal Choudhury

(57) ABSTRACT

Embodiments can include methods, devices and systems which can transmitting a preamble across a first channel according to a first communication protocol; sequentially transmitting signal values in a plurality of narrow bands; monitoring the narrow bands for response communications; and upon detecting response communications on at least one of the narrow bands, establishing communications across at least one of the narrow bands. Each narrow band can be a different portion of the first channel.

23 Claims, 12 Drawing Sheets

(56) References Cited

U.S. PATENT DOCUMENTS

| | | | |
|---|---|---|---|
| 2018/0124752 A1* | 5/2018 | Takeda | H04W 72/042 |
| 2018/0183491 A1 | 6/2018 | Takeda et al. | |
| 2018/0316467 A1* | 11/2018 | Zhu | H04L 5/0053 |
| 2018/0332566 A1* | 11/2018 | You | H04L 1/0091 |
| 2019/0081761 A1 | 3/2019 | Liu et al. | |
| 2020/0092875 A1* | 3/2020 | Takeda | H04W 72/048 |
| 2020/0137795 A1* | 4/2020 | Wang | H04L 5/001 |
| 2020/0228283 A1* | 7/2020 | Cai | H04W 72/0406 |

OTHER PUBLICATIONS

Written Opinion of the International Searching Authority for International Application No. PCT/US20/14903 dated Apr. 16, 2020; 6 pages.

\* cited by examiner

DEVICES, SYSTEMS AND METHODS FOR EXTENDING THE RANGE OF A WIRELESS COMMUNICATION SYSTEM

TECHNICAL FIELD

The present disclosure relates generally to wireless networks, and more particularly to extending a range of a wireless network.

BACKGROUND

Conventional WLAN devices can establish communication connections over a number of channels, each occupying a different portion of a frequency band. Conventional WLAN devices can select channels in a static fashion or a dynamic fashion. As available spectra are used by more devices and other protocols, particularly at the 2.4 GHz band, conventional WLANs can opt for dynamic channel selection in order identify the best channels to use for communication.

Conventionally, an access point (AP) device in a WLAN network can dwell on the channel to acquire performance data. If a packet error rate of the channel is too high, the channel can be avoided. If a packet error rate of the channel is acceptable, communications can occur with another device over the channel.

Many conventional networks (e.g., IEEE 802.11 wireless networks) can operate with an AP that serves as the connection point for other devices (e.g., stations, STA). Various factors, including operating environment, network topology and/or transmission power can limit the range of links between network devices. In particular, Internet-of-thing (IOT) devices may have a more limited range in connecting to an AP.

Any ability to extend a communication range in a wireless device could improve the performance of a wireless network, as well as enable additional applications for wireless systems.

DETAILED DESCRIPTION

Figure 1A:
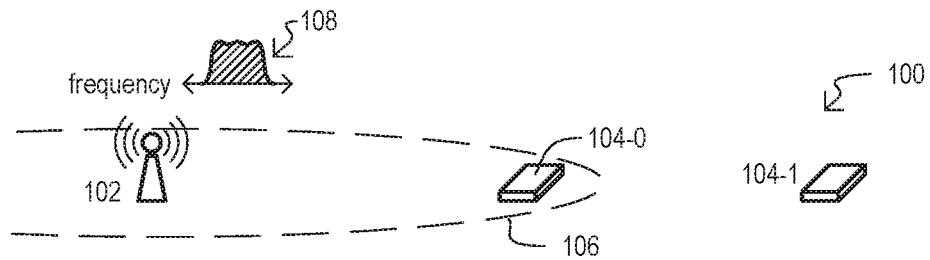
FIGS. 1A to 1D are diagrams of a system and operations according to embodiments.

According to embodiments, a network can include a first device (e.g., an access point, AP) that can transmit across a channel to discover one or more second devices (e.g., stations, STAs) to establish network connections with such second devices. The first device can also transmit over multiple narrow bands to attempt to discover other devices. Narrow bands can have a smaller range of frequencies than the channel. In some cases, narrow bands can be different portions of the channel. In the event a first device receives a response from another device over one or more narrow bands, a determination can be made on the quality of the narrow bands, and one or more narrow bands can be then used to transmit data between the two devices.

In some embodiments, narrow band transmissions can occur at a higher power spectral density (PSD) than transmissions across the channel.

In some embodiments, a first device can repeat transmissions (e.g., packets) on narrow band channels. A second device can use such repeated transmissions to improve decoding of received data values.

In some embodiments, a hopping sequence between narrow bands can occur according to a predetermined sequence known by the first and second devices. In addition or alternatively, a hopping sequence between narrow bands can be established by communications (e.g., negotiation) between a first and second device.

In some embodiments, a discovery operation by a first device can include the transmission of a preamble according to a first protocol over the channel, followed by transmissions over the narrow bands.

In the various embodiments below, like items are referred to by the same reference characters, but with the leading digit(s) corresponding to the figure number.

FIGS. 1A to 1D are a sequence of block diagram of a system 100 and operations according to embodiments. A system 100 can include a first device 102 and one or more other devices 104-0/1. In some embodiments a first device 102 can be an access point (AP) that operates to connect various devices in a network. Each of the other devices (104-0/1) can be a station device (STA) that can connect to the AP and can connect to each other through the AP. Devices 104-0/1 will be referred to as "station" devices, but this should not be construed as implying any particular network topology or communication protocol.

Referring to FIG. 1A, a first device 102 can transmit signals across a first frequency channel (represented by 108) that can generally have a first range 106. It is understood that a range 106 can vary according to device, environment, or other factors. Station device 104-0 can be within first range 106, while station device 104-1 can be outside of the first range 106.

In some embodiments, first device 102 can have a first discovery mode, in which a first device 102 can transmit signals across a first channel 108 in an attempt to discover station devices (e.g., 104-0/1). In some embodiments, a first device 102 can perform an auto channel selection operation, cycling through a number of channels (e.g., bands) in a predetermined fashion.

Figure 1B:
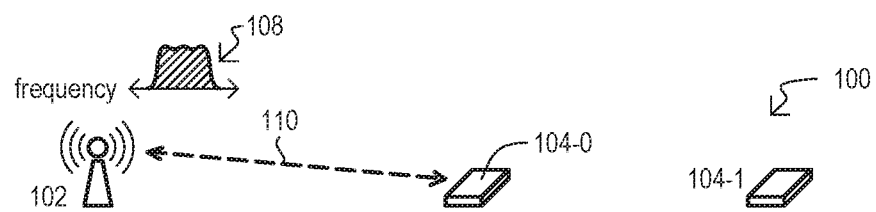

Referring to FIG. 1B, it is assumed that first device 102 and station device 104-0 discover one another, as station device 104-0 is within range 106. Subsequently, first device 102 and station device 104-0 establish a connection 110 according to a connection process. Communications can then continue between first device 102 and station device 104-0 across first channel 108 (or other channels of similar frequency range). Such communications can be according to a first protocol. In some embodiments, a first protocol can be any suitable wireless IEEE 802.11 standard.

Figure 1C:
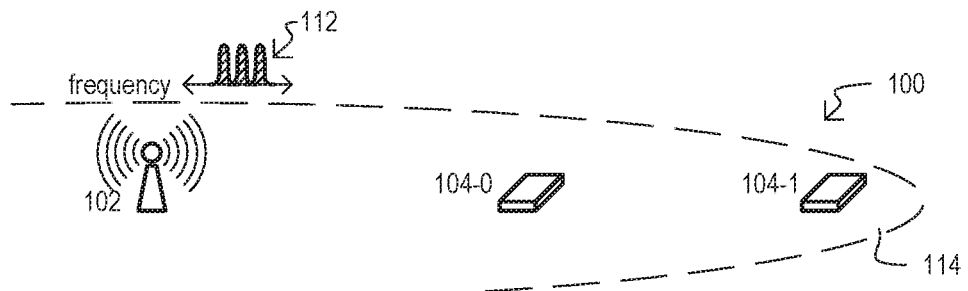

Referring to FIG. 1C, a first device 102 can also transmit signals in a number of narrow bands (represented by 112). Some or all of the narrow bands 112 can have a range 114 that is greater than a range achieved by transmitting across first channel 108 (i.e., range greater than 106). Narrow bands 112 can have a smaller frequency range than first channel 108. In some embodiments, narrow bands 112 can be different portions of a first channel 108. A narrow band 112 can have a greater range than first channel 108 due to any suitable reason. As but one example, the narrow band can have lower loss than the first band (e.g., due to the system environment). As another example, the narrow band signal can be transmitted with greater power than signals of the first channel 108. Such greater power transmission can be by first device 102, station device 104-1, or both. As a further example, the manner in which data are transmitted over the narrow band(s) can enable greater range.

A first device 102 can have a second discovery mode, different from that described in FIG. 1A. In a second discovery mode, a first device 102 can transmit signals in multiple narrow bands, which can discover devices beyond the first range 106 or devices capable of communicating over narrow bands (e.g., station device 104-1). In some embodiments, first device 102 can hop between different narrow bands in such a second discovery mode. Further, as is also described in embodiments below, first device 102 can repeat signals (e.g., symbols) in a same narrow band to provide a better chance for station device 104-1 to decode received signal data.

Figure 1D:
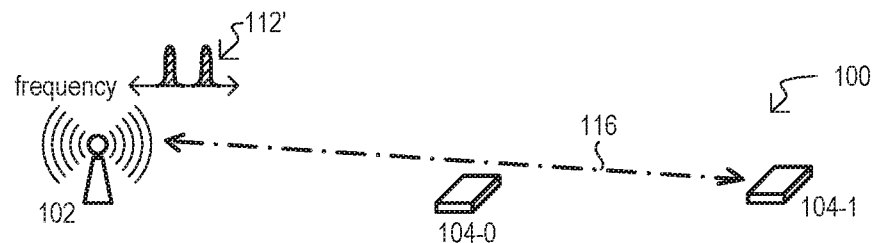

Referring to FIG. 1D, it is assumed that first device 102 and station device 104-1 discover one another, as station device 104-1 is within range 114. Subsequently, first device 102 and station device 104-1 establish a connection 116 according to a connection process different than that for connection 110. A connection 116 can include transmissions across one or more narrow bands 112' selected as transmission bands. It is noted that transmission bands 112' can be a subset of the narrow bands used in a second discovery operation. In particular, a selection can be made among narrow bands to arrive at which transmission bands are used for connection 116. Such a selection can be made based on any of various criteria, including but not limited to: narrow bands on which return signals are detected, narrow bands having lower (or lowest) error rates, or data exchanged between devices (e.g., a negotiation, or the like).

In some embodiments, switching between discovery modes can be periodic. That is, a first device 102 can periodically switch between discovering station devices with larger frequency channel transmissions (e.g., 108) and discovering station devices with narrow band frequency transmissions (e.g., 112).

In some embodiments, switching between discovery modes can be conditional. As but one example, first device 102 can attempt to discover station devices by transmissions across a channel (e.g., 108). In the event no devices are detected using a channel (or multiple channels), or all devices detectable by the channel(s) are discovered (e.g., registered), first device 102 can switch to discovering devices with narrow band transmissions.

In some embodiments, a first device 102 can switch between connection types based on application. As but one example, transmissions across a channel (e.g., 108) can have a higher data rate than transmissions via narrow bands. Thus, station devices (or applications run by station devices) having lower data transmission rates can be configured to have a narrow band connection (e.g., 116), while station devices, or applications run by station devices having higher data transmission rates can be configured to have a larger bandwidth channel connection (e.g., 110). As another example, transmissions via narrow bands (e.g., 112) may consume less power than transmissions via channels (e.g., 108). A first device 102 can switch between connection types (110/116) based on power needs/requirements.

Figures 2A, 2B:
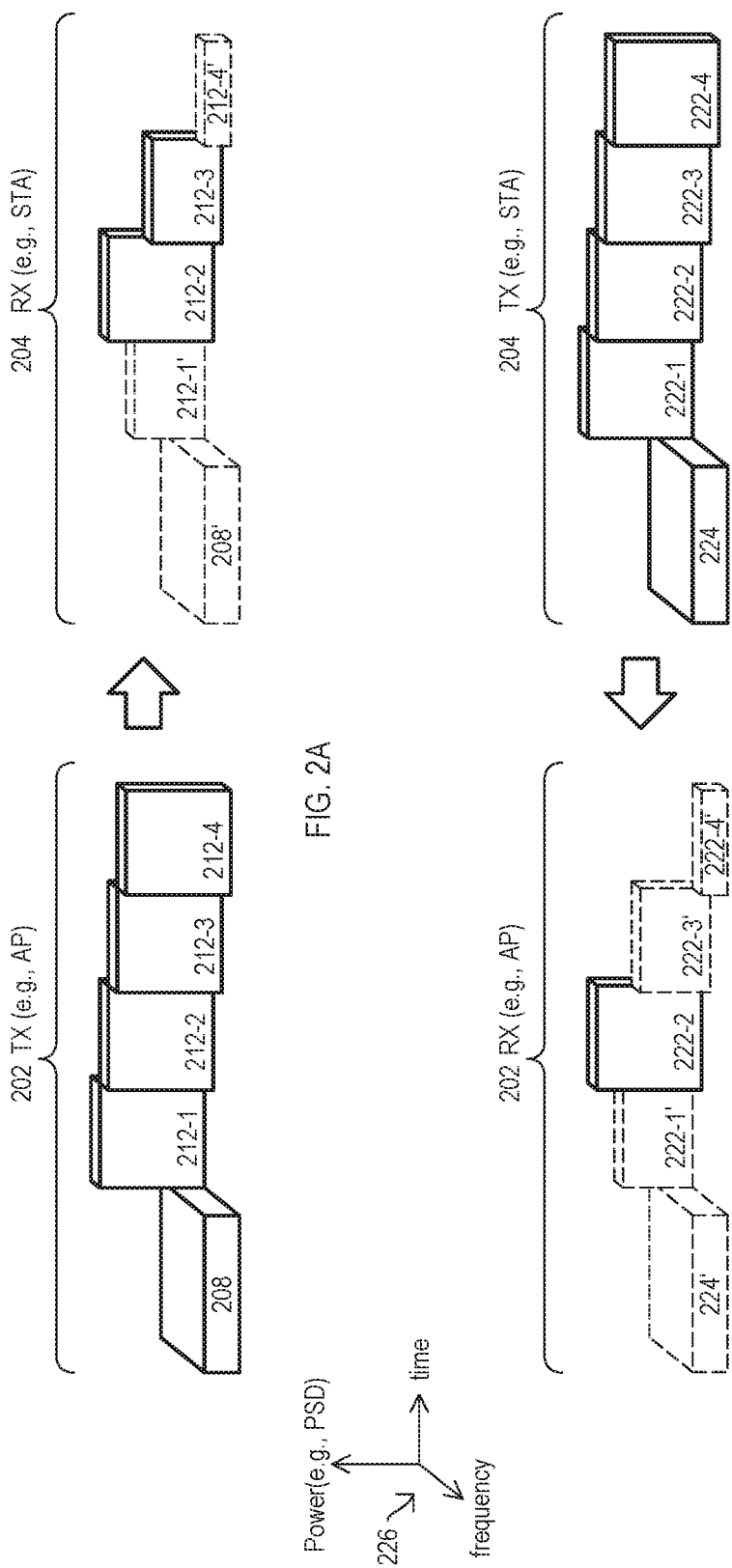
FIGS. 2A and 2B are diagrams showing transmission along different narrow bands to determine the best narrow bands for transmission according to embodiments.

FIGS. 2A and 2B are diagrams showing signal transmissions for a channel measurement operation according to an embodiment. FIG. 2A shows "downlink" (DL) transmissions that can occur from a first device 202 (e.g., an AP) to a station device 204. FIG. 2B shows subsequent "uplink" (UL) transmissions that can occur from station device 204 to first device 202. Data transmission blocks are represented in three dimensional views, with different dimensions for power, time and frequency, as shown by corresponding axes 226. In some embodiments, transmission blocks can be data packets.

Referring to FIG. 2A, in a DL operation a first device 202 can transmit data blocks 208 and 212-1 to 212-4. Data block 208 can be transmitted across a first channel. Data blocks (212-1 to 212-4) can be transmitted across different narrow bands. That is, after data block 212-1 is transmitted across one narrow band, a first device 202 can hop to another narrow band and transmit data block 212-2. This is followed by data block 212-3 across another narrow band, etc. In the embodiment shown, data blocks 212-1 to 212-4 can be transmitted at a higher power (e.g., high power spectral density) than data block 208. It is understood that while data blocks 208 and 212-1 to 212-4 can be transmitted one after the other, such data blocks can also be transmitted according to a different order.

Referring still to FIG. 2A, a station device 204 may only receive some of the data blocks transmitted by the first device 202. Data blocks 208' and 212-1' to 212-4' can correspond to data blocks 208 and 212-1 to 212-4 transmitted by first device 202. In the embodiment shown, data blocks that are not received or not successfully decoded are shown with dashed lines. Thus, FIG. 2A shows data blocks 208', 212-1' and 212-4' as "bad" data blocks, and their corresponding narrow bands can be considered unsuitable for transmission. In contrast, data blocks 212-2 and 212-3 are considered "good" data blocks. Thus, their corresponding narrow bands can be considered candidates for use as transmission bands for use with first device 202.

In the embodiment shown, data block 212-2 can be received at a greater power level (and/or a lower error rate) than data block 212-3. Thus, the narrow band corresponding to data block 212-2 can be considered a preferred transmission band as compared to the narrow band corresponding to data block 212-3.

Referring to FIG. 2B, in an UL operation station device 204 can transmit data blocks 224 and 212-1 to 222-4. Such data blocks can correspond to those shown as 208 and 212-1 to 212-4 of FIG. 2A (e.g., a transmission across a return set of channels). Thus, data block 224 can be transmitted across a first channel and data blocks (222-1 to 222-4) can be transmitted across different narrow bands.

Referring still to FIG. 2B, a first device 202 may only receive some of the data blocks transmitted by the station device 204. Data blocks 224' and 222-1' to 222-4' received by first device 202 can correspond to data blocks 224 and 222-1 to 222-4 transmitted by second device 204. Thus, FIG. 2B shows data blocks 224', 222-1', 222-3' and 212-4' as bad data blocks, while data block 222-2 is a good data block. Thus, unlike FIG. 2A, data block 222-3 is not received (and/or successfully decoded). Such a result can represent a power transmission limitation in an UL operation, as but one example. Based on such a result, a first device 202 can determine that the narrow band corresponding to data block 222-2 can be selected as a narrow band for transmission.

In some embodiments, a first channel (e.g., represented by data block 208, for example) can be about 20 MHz and larger, while narrow bands can be different portions of the first channel, for example, about 10 MHz, about 5 MHz or about 2 MHz. In a very particular embodiment, a first device 202 can be compatible with the IEEE 802.11 ax or similar standard, that anticipates dividing channels into smaller resource units (RUs). Data blocks 208 (and 224) can be preambles, and each narrow band can be a different RU. A first device 202 can hop between RUs to evaluate which ones would work best as its own narrow band channel. In some embodiments, data can be transmitted at a higher power (e.g., PSD) when hopping between the RUs, as compared to the preamble at the larger bandwidth channel.

Figure 3:
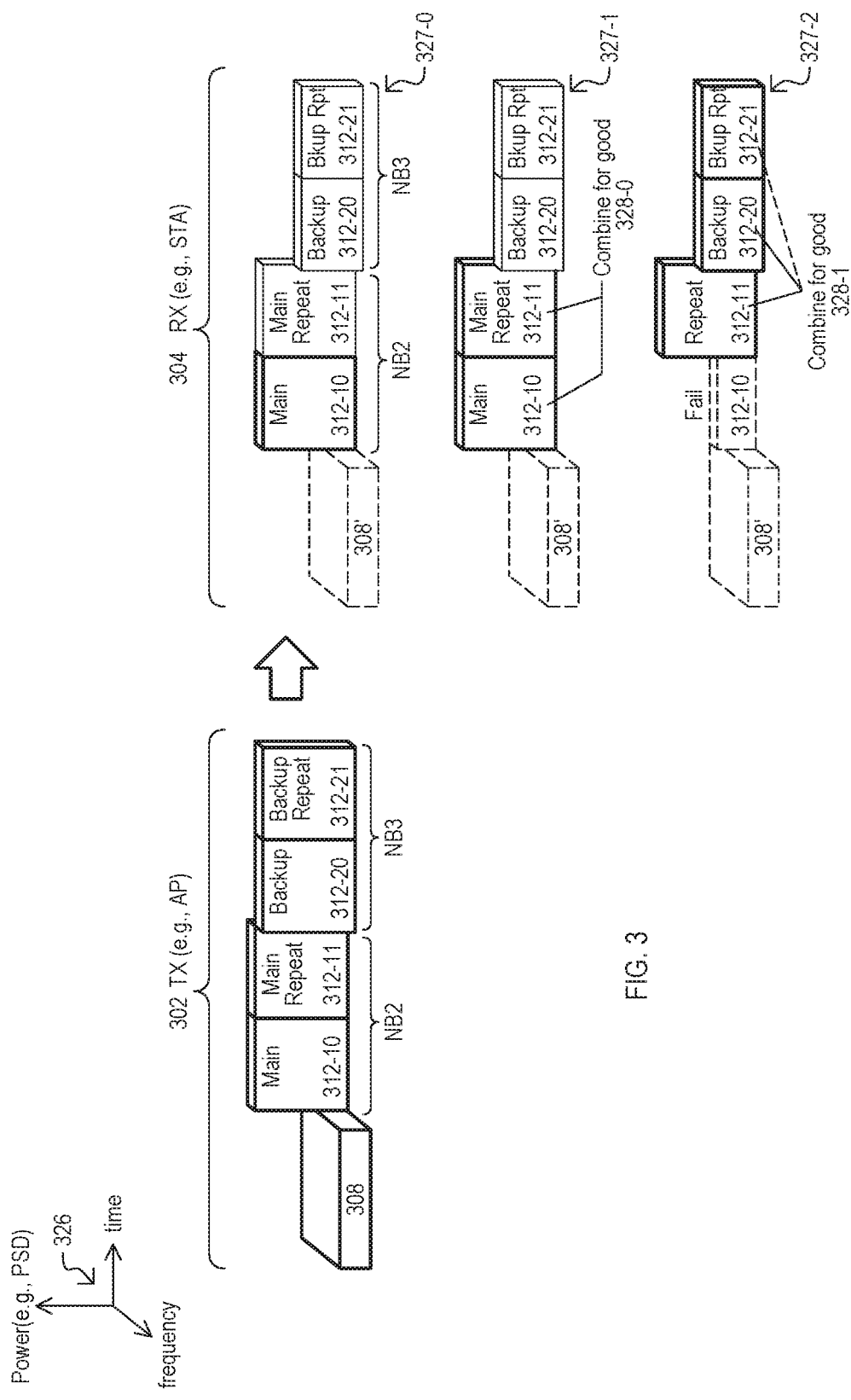
FIG. 3 is a diagram showing the repetition of data on same narrow bands according to embodiments.

FIG. 3 is a timing diagram showing how a first device 302 can make narrow band communications according to an embodiment. Transmitted data (e.g., packets) are represented in the same manner as FIGS. 2A and 2B, as shown by axis 326. In FIG. 3 it is assumed that two narrow bands (shown as NB2 and NB3) have been determined to be "good" bands according to any of the approaches shown herein, or equivalents. Further, channel NB2 is determined to be preferred over NB3. A first device 302 can transmit data blocks 312-10/11 across narrow band NB2 and data blocks 312-20/21 across narrow band NB3. Optionally, first device 302 can also transmit a data block 308 over a wider bandwidth channel.

FIG. 3 shows how redundant transmissions can enhance the robustness of narrow band communications according to embodiments. A data block 312-10 on a preferred narrow band (NB2) can be followed by data block 312-11 on the same narrow band (NB2), where data block 312-11 is a copy of the preceding data block 312-10. The first data block 312-10 can be considered a "main" data block as it is transmitted over the preferred narrow band. The subsequent data block 312-11 can be considered a "main repeat" data block as it can be a repeat of data block 312-10 used to recover data (e.g., complete decoding), if necessary.

A data block transmitted on a preferred narrow band can be repeated on one or more other narrow bands. This is shown by example in FIG. 3, by data block 312-20, which can be transmitted on narrow band (NB3) that is different from the preferred narrow band (NB2). Data block 312-20 can be a copy of those transmitted the preferred narrow band (i.e., 312-10/11), and so can be used if transmissions on the preferred narrow band are not sufficient to decode the data. Thus, data block 312-20 can be considered a "back-up" data block. A back-up data block itself can be repeated for even further recovery capabilities. This is shown as data block 312-21 in FIG. 3, which can be considered a "back-up repeat" data block.

FIG. 3 shows three of many possible data receiving operations of a station device 304 in response to data blocks 308, 312-10/11 and 312-20/21 transmitted by first device 302. These responses are shown as 327-0, 327-1 and 327-2. In all three responses, it is assumed station device 304 cannot receive or decode data in the first (wider) channel (e.g., data block 308).

In response 327-0, a station device 304 successfully decodes the data with the main (e.g., first) data block 312-10 received over the preferred narrow band (NB2). Consequently, all following copies of the data block (the main repeat 312-11, back-up 312-20 and back-up repeat 312-20) can be ignored.

In response 327-1, a station device 304 cannot successfully decode the data with only the main data block 312-10. As a result, received values from main repeat data block 312-11 can be combined (328-0) with those of main data block 312-10 to successfully decode the data values. Such operations can take any suitable form, and in particular embodiments can use soft log likelihood ratio (soft-LLR) techniques. In such case, back-up data blocks (312-20/21) can be ignored.

In response 327-2, a station device 304 does not successfully receive the main data block 312-10. Further, the data cannot be successfully decoded with only the main repeat data block 312-11. As a result, received values from main repeat data block 312-11 can be combined (328-1) with one or both back-up data blocks (i.e., 312-20/21), received on a different narrow band. Such combining/decoding/demapping operations can take any suitable form as described herein, and equivalents.

In some embodiments, data blocks 312-10/11/20/21 can be data packets. Further, bands and narrow bands can take the form of those described for FIGS. 2A and 2B (e.g., RUs of IEEE 802.11ax standard).

Figure 4:
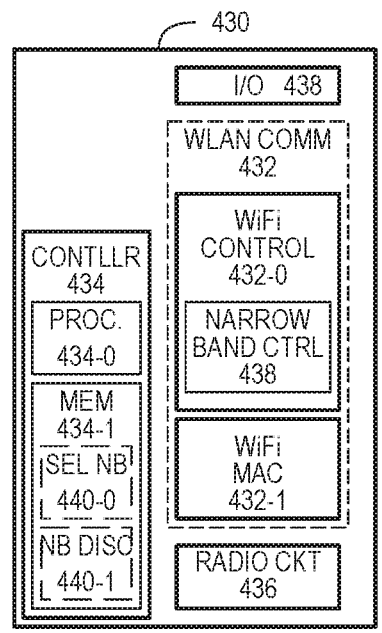
FIG. 4 is a block diagram of a device according to an embodiment.

FIG. 4 is a block diagram of a device 430 according to an embodiment. In some embodiments, device 430 can be one particular implementation of either or both of those shown as 102 and 104-1 in FIGS. 1A to 1D. A device 430 can include communication circuits 432, controller 434, radio circuits 436, and input/output (I/O) circuits 438. Communication circuits 432 can be WLAN circuits, including a WiFi control circuit 432-0 and WiFi media access control (MAC) circuits 432-1. WLAN circuits can operate in any suitable band, including a 2.4 GHz band, 5.0 GHz band and/or 6.0 GHz band. In some embodiments, WLAN circuits can be compatible with a wireless IEEE 802.11 standard.

However, unlike conventional devices, WiFi control circuit 432-0 can also include a narrow band control circuit 438. A narrow band control circuit 438 can enable communication circuits 432 to transmit and receive across selected narrow bands in response to data and control signals. Thus, communication circuits 432 can transmit and receive across a number of standard channels and a number of narrow bands. Narrow bands can occupy portions of standard channels, as described herein and equivalents.

Radio circuits 436 can include circuits for receiving and transmitting signals according to at least two different protocols. Radio circuits 436 can include any suitable circuits according to a selected protocol, and in some embodiments can include physical interface (PHY) circuits and baseband circuits. In some embodiments, radio circuits 436 can transmit/receive on any internationally recognized industrial, scientific, or medical (ISM) band.

A controller 434 can control transmissions by communication circuits 432. In some embodiments, a controller 434 can include circuits (or instructions executable by circuits)

for determining and/or selecting a narrow band for transmission 440-0, as well as processes for discovering devices that can communicate over narrow bands 440-1, as described in various embodiments herein, and equivalents. In the embodiment shown, a controller 434 can include a processor section 434-0 and a memory section 434-1.

I/O circuits 438 can enable control of device 430 by another system external to the device 430. VO circuits 438 can include circuits that enable communication with the device according to any suitable method, including any of various serial data communication standards/methods including but not limited to: serial digital interface (SDI), universal serial bus (USB), universal asynchronous receiver transmitter (UART), I²C, or I²S.

In some embodiments, device 430 can be an integrated circuit device, with the various portions being included in one integrated circuit package or formed in a same integrated circuit substrate.

Figure 5:
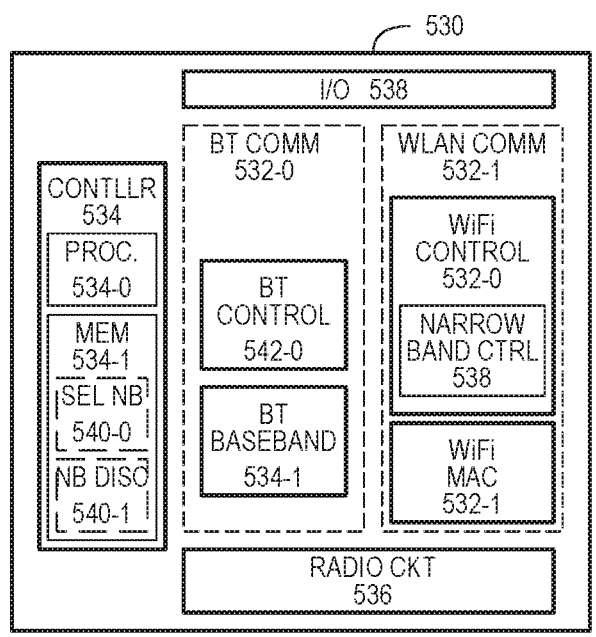
FIG. 5 is a block diagram of a combination device according to an embodiment.

FIG. 5 is a block diagram of a combination device 530 according to another embodiment. In some embodiments, combination device 530 can be one particular implementation of either or both of those shown as 102 and 104-1 in FIGS. 1A to 1D. A combination device 530 can include first communication circuits 532-0, second communication circuits 532-1, controller 534, radio circuits 536, and input/output (I/O) circuits 538. First communication circuits 532-0 can be Bluetooth (BT) circuits including BT control circuits 542-0 and BT baseband circuits 542-1. BT circuits can operate in a 2.4 GHz band. Second communication circuits 532 can be WLAN circuits, like those shown in FIG. 4, or an equivalent. WLAN circuits can also operate in a 2.4 GHz band, as well as other bands, such as a 5.0 GHz or 6.0 GHz band, as but two of many possible examples.

A controller 534 can be a controller like that shown as 434 in FIG. 4. In addition, a controller 534 can control access to shared frequencies of a 2.4 GHz band by first and second communication circuits 532-0/1.

Radio circuits 536 can take the form of any of those described herein or equivalents. I/O circuits 538 can take the form of any of those described herein or equivalents.

In some embodiments, device 530 can be an integrated circuit device, as described herein.

Figure 6:
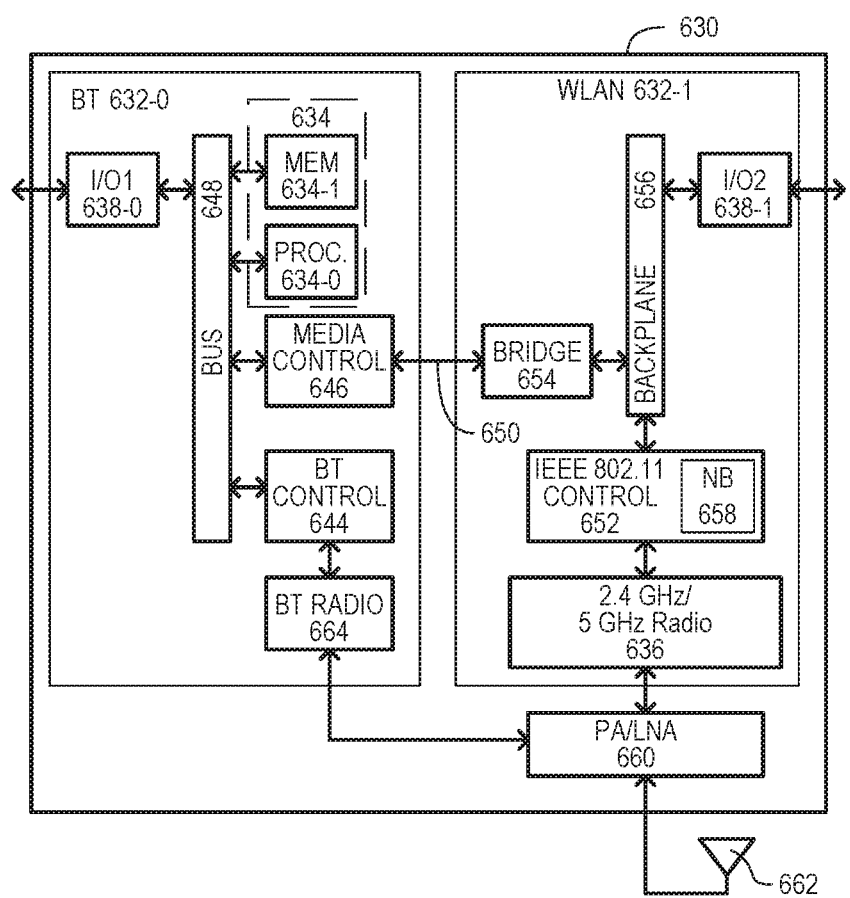
FIG. 6 is a block diagram of a combination device according to another embodiment.

FIG. 6 is a block diagram of a combination device 600 according to another embodiment. In some embodiments, combination device 600 can be one particular implementation of that shown in FIG. 5. A combination device 600 can include a BT section 632-0, a WLAN section 632-1, and an amplifier section 660.

A BT section 632-0 can include a controller 634, BT control circuits 644, media control circuit 646, and first I/O circuits 638-0 in communication with one another over a bus 648. A controller 634 can control operations of combination device 630, including operations within WLAN section 634-1. In some embodiments, a controller 634 can issue control signals over bus 648 that can be transmitted to WLAN section 634-1 over bridge 650 via media control circuits 646. A controller 634 can include one or more processors 634-0 and a memory system 634-1. A controller 634 can control narrow band discovery operations, and control which narrow bands are used for transmission as described herein, or equivalents. A BT radio section 664 can enable BT radio functions.

A WLAN section 632-1 can include IEEE 802.11 control circuit 652, bridge control circuit 654, and second I/O circuits 638-1 in communication with one another over a backplane 656. IEEE 802.11 control circuits 652 can include circuits for performing functions according to any IEEE 802.11 wireless or equivalent standard. In addition, IEEE 802.11 control circuits 652 can include narrow band control circuits 658 which can enable transmission over narrow bands, which in some embodiments can be RUs of an IEEE 802.11ax standard. IEEE 802.11 control circuits 652 can be connected to dual band radio circuits 636. Dual band radio circuits 636 can transmit and receive data on one or more WLAN bands (e.g., 2.4 GHz, 5 GHz, 6 GHz), as well as narrow bands within any or all such bands.

Bridge control circuit 654 can control data transfer operations between BT section 632-0 and WLAN section 632-1 over bridge 650, including the transfer of control signals or instructions for indicating a quality WLAN channels (including narrow bands) used by WLAN section 632-1. Second I/O circuits 634-1 can enable communication with the combination device 630 according to any of the embodiments described herein or equivalents.

An amplifier section 660 can include one or more power amplifiers (PAs) for transmitting signals as well as one or more low noise amplifiers (LNAs) for receiving signals. In some embodiments, amplifier section 660 can include power amplifiers for increasing the power (e.g., PSD) of narrow band transmissions as compared to wider bandwidth channel transmissions. Amplifier section 660 can be connected to an antenna 662.

Figure 7A:
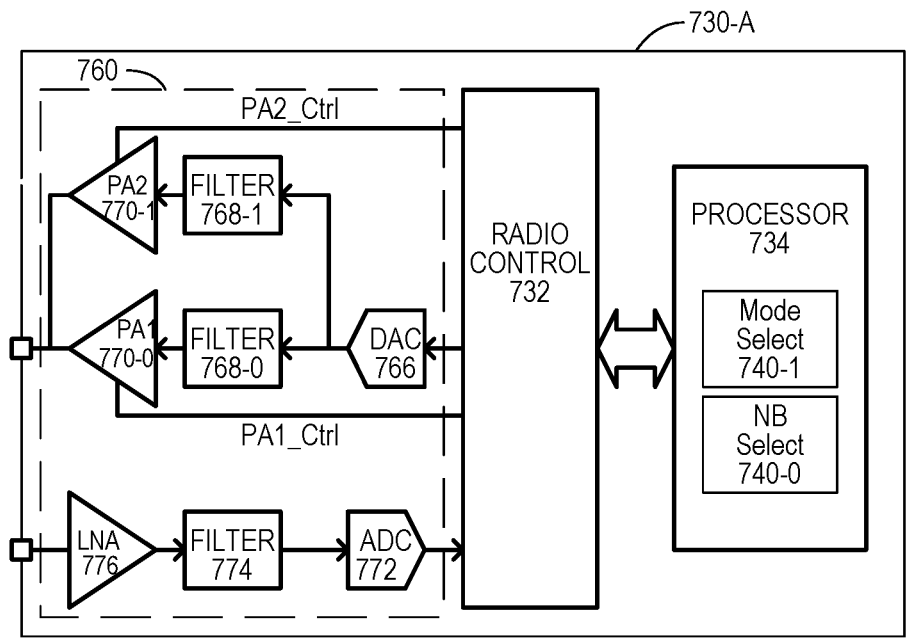
FIGS. 7A and 7B are diagrams showing devices according to embodiments.
Figure 7B:
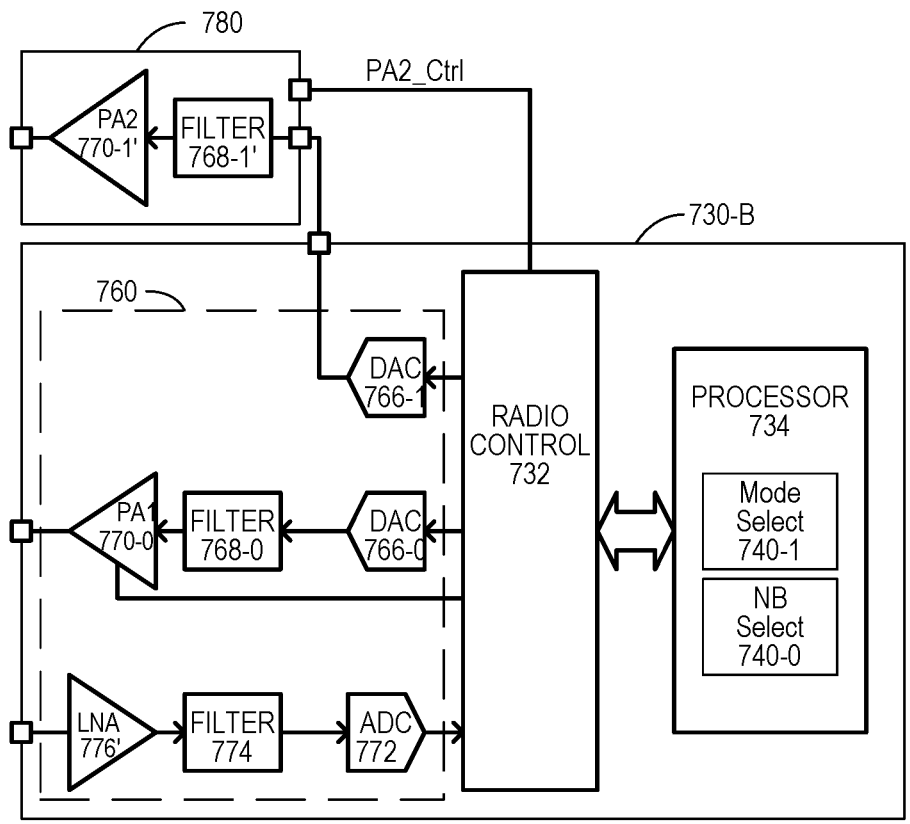

FIGS. 7A and 7B are diagrams showing devices according to additional embodiments. The embodiments show how power amplifier circuits can increase the power (e.g., PSD) of narrow band transmissions as opposed to other transmissions in wider bandwidth channels.

Referring to FIG. 7A, a device 730-A having built-in dual power transmission capability is shown in a block schematic diagram. A device 730-A can include a processor section 734, radio control circuits 732 and an amplifier section 760. A processor section 734 can control operations of a device 730-A, including selecting narrow bands 740-0 for transmission, as well as particular modes of operation 740-1. Mode select 740-1 can include selecting between different discovery modes as described herein, and equivalents (e.g., discovering any or all station devices using one or more standard channels, then switching to narrow bands to extend a discovery/communication range).

Radio control circuits 732 can control radio operations, including transmitting over narrow bands and larger bandwidth channels as described herein and equivalents.

Amplifier section 760 can include a digital-to-analog converter (DAC) 766, first filter 768-0, second filter 768-1, first PA 770-0, second PA 770-1, LNA 776, filter 774 and analog-to-digital converter (ADC) 772. In some embodiments, transmissions over a standard (i.e., larger bandwidth) channel can occur via DAC 766, filter 768-0 and PA 70-0, and can have a first PSD limit. Transmission over narrow bands (i.e., bands smaller than standard channels) can occur via DAC 766, filter 768-1, and PA 70-1, and can have a second PSD limit that is greater than a first PSD limit. PAs 70-0/1 can be controlled by PA control signals PA1_Ctrl and PA2_Ctrl, respectively.

In some embodiments, device 730-A can be an integrated circuit device, as described herein.

Referring to FIG. 7B, a device 730-B having an additional, external power amplifier is shown in a block schematic diagram. A device 730-B can include features like those of FIG. 7A, and such like features are shown with the same reference characters.

FIG. 7B differs from FIG. 7A in that it can include one DAC 766-0 for transmissions over standard channels and another DAC 766-1 for higher power transmissions over narrow bands. FIG. 7B also differs from FIG. 7A in that device 730-B can connect to amplifier device 780, which can include a PA 770-1' and filter 768-1'. PA 770-1' and filter 768-1' can transmit signals on narrow bands at a higher maximum power (PSD) than those transmitted by PA 770-0 on device 730-B. Control signals PA2_Ctrl can be provided to amplifier device 780 from device 730-B.

In some embodiments, device 730-B can be an integrated circuit device, as described herein, and amplifier device 780 can be a separate integrated circuit device, which may or may not be included in the same integrated circuit package as device 730-B.

Figure 8:
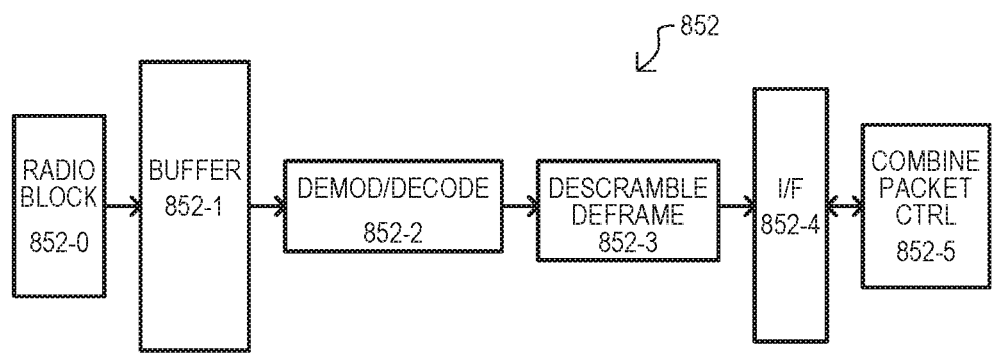
FIG. 8 is a diagram of decoding circuits that can be included in embodiments.

FIG. 8 shows examples of decoding circuits 878 that can be included in embodiments. Decoding circuits 878 can include a radio block 852-0, a buffer 852-1, demodulator/decoder 852-2, a descramble/deframe section 852-4, interface 852-4 and control section 852-5. Radio block 852-0 can connect to radio circuits to receive data values, including those transmitted in standard channels and narrow bands. A buffer 852-1 can store values received from radio block 852-0. This can include data blocks repeated on one or more narrow bands (e.g., as shown in FIG. 3).

Demodulator/decoder 852-2 can decode values received from buffer 852-1. In some embodiments, according to control values from control section 852-5 values generated by demodulator/decoder 852-2 can be used to combine one data block with another data block (e.g., buffered packets) in the event a data block cannot be decoded alone. For example, operations like those shown in FIG. 3 can be performed (e.g., soft LLR). A descrambler/deframer 852-3 can descramble and/or deframe packet data. An interface 852-4 can enable data to be transferred and operations to be controlled by control section 852-5. In some embodiments, decoding circuits 852 can be part of the physical layer interface (PHY) to radio circuits.

Figure 9:
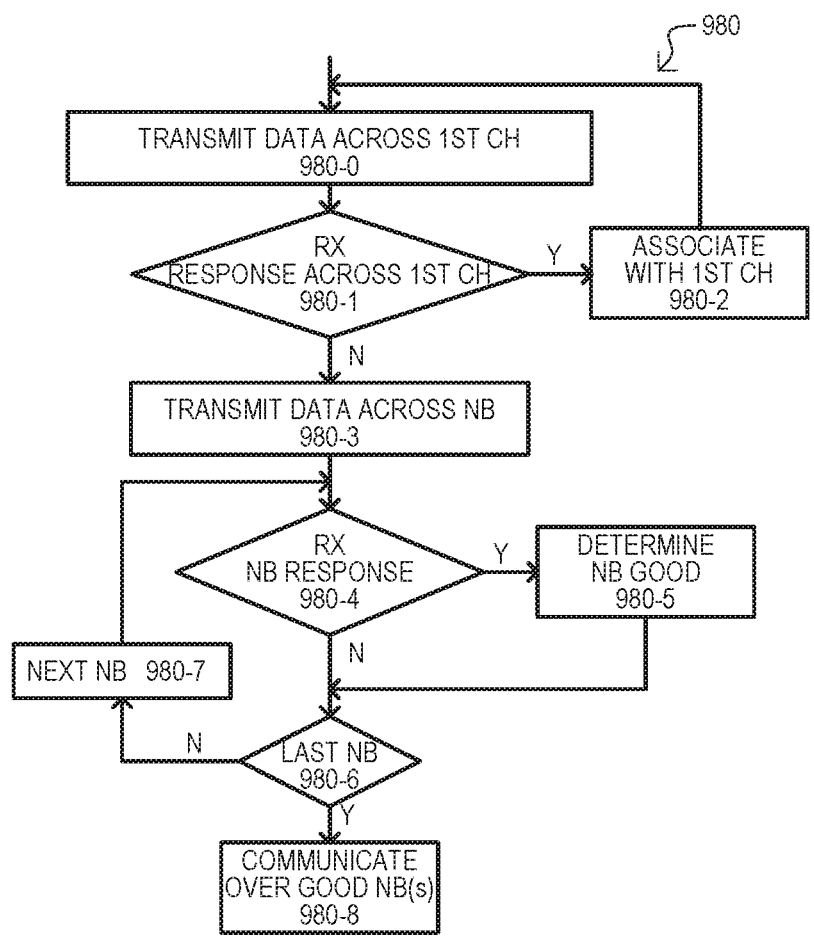
FIG. 9 is a flow diagram of an access point (AP) method according to an embodiment.

FIG. 9 is a flow diagram of a method 980 according to an embodiment. A method 980 can be executed by a device, such as an AP or the like (e.g., 102 in FIGS. 1A to 1D). A method 980 can include transmitting data across a first channel 980-0. If a response is received across the first band (Y from 980-1) an association can be made with a responding device 980-2. A method 980 can then return to 980-0.

If no responses are received across the first band (N from 980-1), a method can transmit data across a number of narrow bands 980-3. Narrow bands are understood to have frequency ranges smaller than that of the first channel. In some embodiments, this can include sequentially hopping through a sequence of narrow bands. In some embodiments, narrow bands can each be a different portion of the first channel.

A method 980 can then monitor the narrow bands for responses 980-4. If response is received on a narrow band (Y from 980-4), the narrowband can be considered "good" and thus available to use for transmission. Evaluation of narrow bands can continue (980-7) until a last narrow band has been evaluated (Y from 980-6).

A method 980 can then communicate on good narrow bands 980-8. Such an action can include using all good narrow bands, or only some of the good narrow bands. Further, such an action can include repeating data on one or more narrow bands for added connection robustness, as shown in FIG. 3, or in an equivalent fashion.

Figure 10:
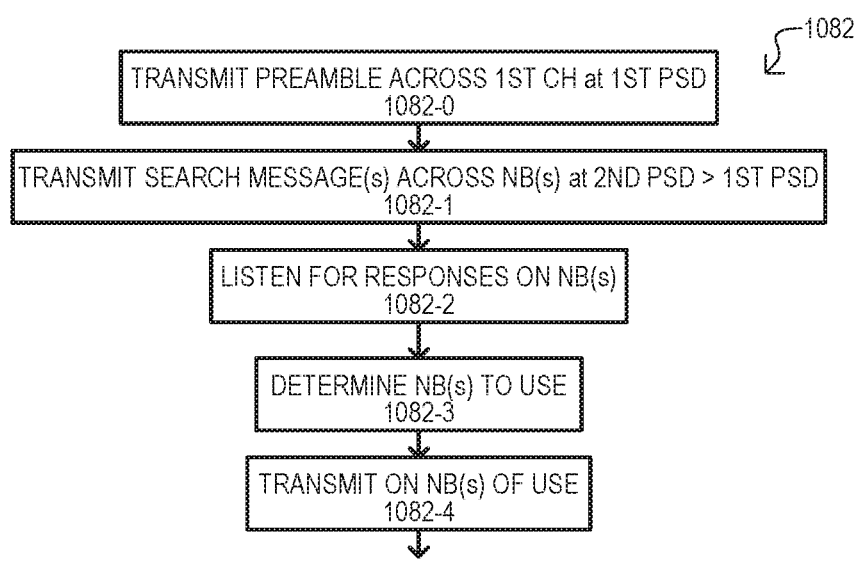
FIG. 10 is a flow diagram of an AP method according to another embodiment.

FIG. 10 is a flow diagram of another method 1082 according to another embodiment. A method 1082 can be executed by an AP device, or the like. Method 1082 can include transmitting a preamble across a first channel and at a first PSD 1082-0. Such an action can include transmitting a sequence of symbols according to a predetermined protocol. In some embodiments, this can include transmitting a preamble according to the IEEE 802.11ax or a related or similar protocol.

A method 1082 can also include transmitting a search message across one or more narrow bands at a second PSD that is greater than the first PSD 1082-1. Such an action can include transmitting across frequency bands smaller than the first channel. In some embodiments, this can include transmitting in a portion of the first channel. Search messages take any suitable form, and in some embodiments can be beacon type packets, recognizable by other devices configured to listen on narrow bands.

A method 1082 can also include listening for response signals on the narrow bands 1082-2. Such an action can include monitoring the same narrow bands on which search messages were previously transmitted. A method 1082 can determine which NBs to use for subsequent transmissions 1082-3. Such an action can include selecting narrow bands for transmission based on quality of received signals. Messages can then be transmitted on the NBs selected for use 1082-4.

Figure 11:
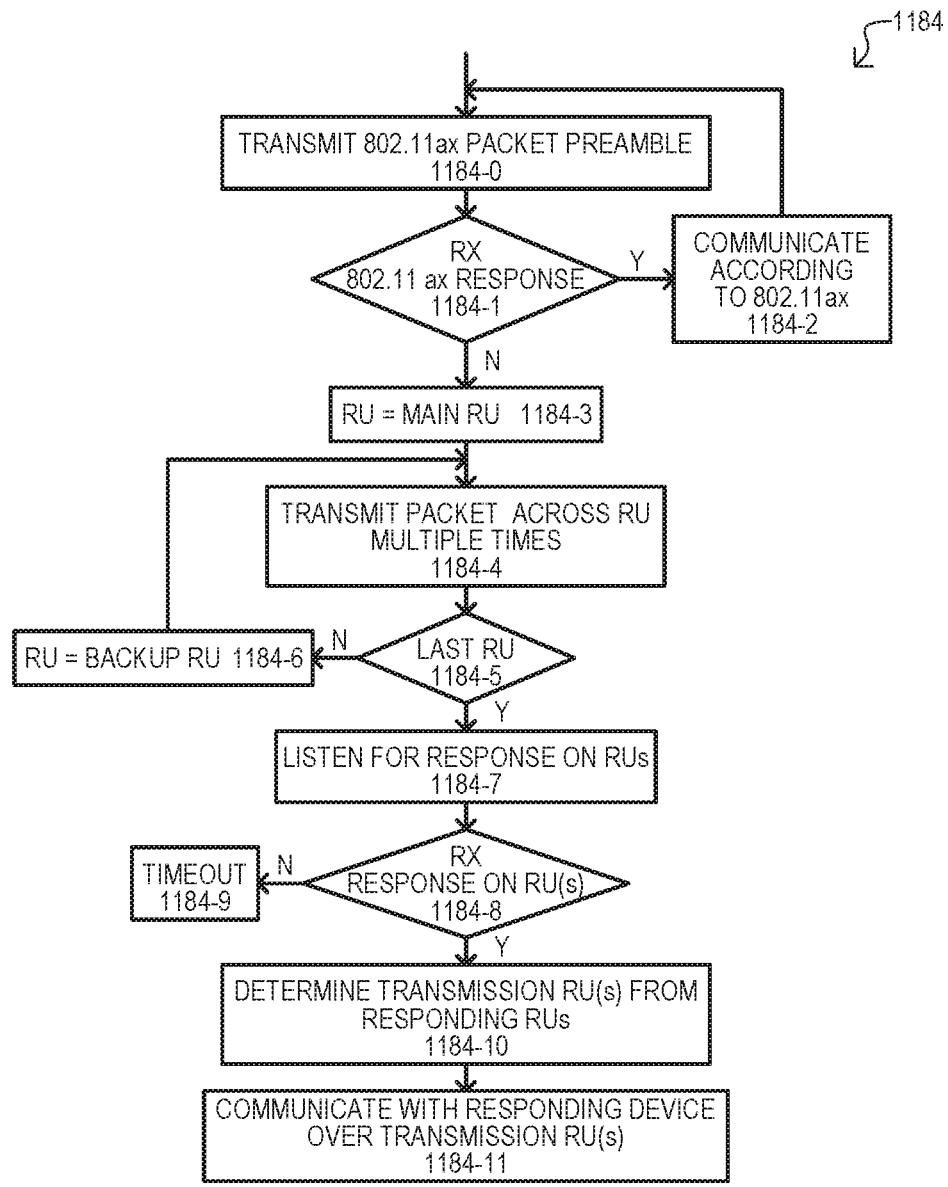
FIG. 11 is a flow diagram of an AP method according to a further embodiment.

Referring to FIG. 11 a method 1184 according to another embodiment is shown in a flow diagram. A method 1184 can be executed by an AP device, or the like, and can include transmitting a preamble of an 802.11ax packet 1184-0, and then waiting for a response 1184-1. If a response is received (Y from 1184-1), a method can associate and communicate according to the 802.11ax standard 1184-2.

If a response is not received (N from 1184-1), a method 1184 can select a main RU from available RUs (1184-3). A packet can then be transmitted across the RU multiple times 1184-4. If packets are to be transmitted across more than one RU (N from 1184-5), a method can proceed to next RU 1184-6 and transmit multiple packets across that RU. In the embodiment shown, multiple packets (e.g., two) can be transmitted across a main RU and a backup RU.

If a last RU is reached (Y from 1184-5), a method 1184 can listen for responses on the RUs 1184-7. If no responses are detected (N from 1184-8), a method can reach a time out condition 1184-9. In some embodiments, a method can return to 1184-0 in the time out condition. However, any other suitable actions can be taken, including entering a sleep or similar state.

If responses are detected (Y from 1184-8), a method 1184 can determine transmission RUs from responding RUs (i.e., RUs on which a sufficient response was received) 1184-10. A method 1184 can then communicate with a responding device over the transmission RUs 1184-11.

Figure 12:
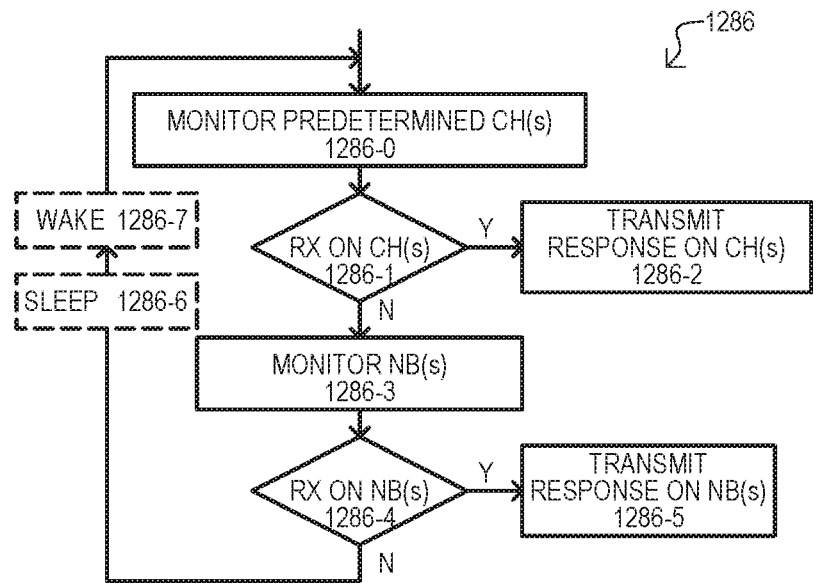
FIG. 12 is a flow diagram of a station device method according to an embodiment.

FIG. 12 shows a method 1286 according to another embodiment. A method 1286 can be executed by a station device, or the like (e.g., 104-1 of FIGS. 1A to 1D). Method 1286 can include monitoring predetermined channels 1286-0. If messages are received across one or more such channels (Y from 1286-1), a method 1286 can include transmitting a response across the channel(s) 1286-2.

If messages are not received on the channels (N from 1286-1), a method 1286 can include monitoring narrow bands for signals 1286-3. Narrow bands can occupy smaller frequency ranges then bands described in 1286-0. A method 1286 can determine if messages are received on one or more narrow bands 1286-4. Such an action can include using decoding methods as described herein or equivalents, including using repeated data blocks to recover data. If messages are received on one or more narrow bands (Y from 1286-4), a method can transmit a response on such narrow bands 1286-5. If messages are not received on one or more narrow bands (N from 1286-4), a method can return to 1286-0. Optionally, a method 1286 can include entering a sleep mode 1286-6 and the subsequently waking from the sleep mode 1286-7.

Figure 13:
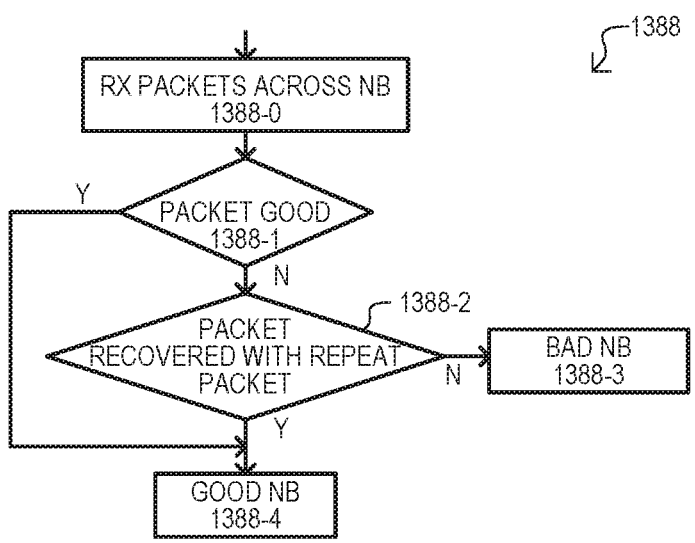
FIG. 13 is a flow diagram of a station device method according to another embodiment.

FIG. 13 shows a method 1388 according to another embodiment, which can be executed by a station device, or the like. Method 1388 can include receiving packets across a narrow band 1388-0. If packet is determined to be good (Y from 1388-1), the narrow band can be considered a "good" narrow band. In some embodiments, response messages can be sent on such narrow bands. If a packet is determined not to be good (N from 1388-1), an attempt can be made to recover the packet with a repeat packet 1388-2. Such an action can include using a packet repeated on the same narrow band, or a backup packet received on another narrow band. If the packet cannot be recovered (N from 1388-2), the narrow band on which it was received can be considered a "bad" narrow band. In some embodiments, bad narrow bands are not used for transmission. If the packet can be recovered (Y from 1388-2), the narrow band on which it was received (and any narrow bands of back-up packets used) can be considered to be good narrow bands 1388-4.

Figure 14:
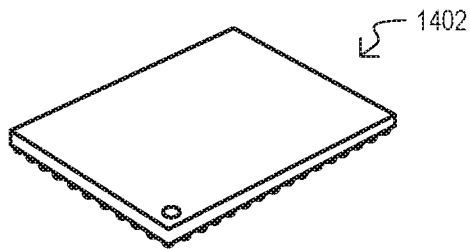
FIG. 14 is a diagram of a device according to another embodiment.

While embodiments can include systems with various interconnected components, embodiments can include unitary devices which can selectively switch from communicating or attempting communications in a first channel, then switching to a number of narrow bands, as described herein or equivalents. In some embodiments, such unitary devices can be advantageously compact single integrated circuits (i.e., chips). FIG. 14 shows one particular example of a packaged single chip combination device 1402. However, it is understood that a device according to embodiments can include any other suitable integrated circuit packaging type, as well as direct bonding of a combination device chip onto a circuit board or substrate.

Figure 15:
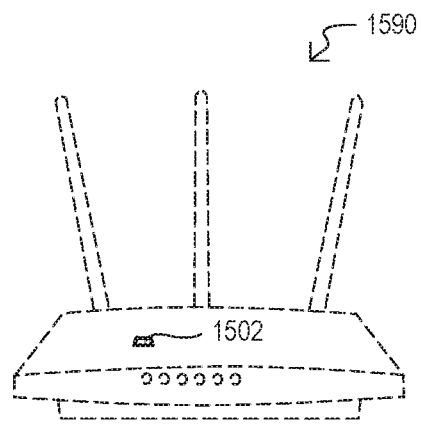
FIG. 15 is a diagram of a system according to another embodiment.

Referring to FIG. 15, another system according to an embodiment is shown in a diagram. A system can include a router device 1590. Router device 1590 can provide routing functions for a first protocol which transmits across one or more channels (e.g., WLAN) while also enabling a second, extended range protocol, which can utilize narrower bands than the channels of the first protocol. In some embodiments, router device 1590 can include a device 1502 like that shown in FIG. 14.

Figure 16:
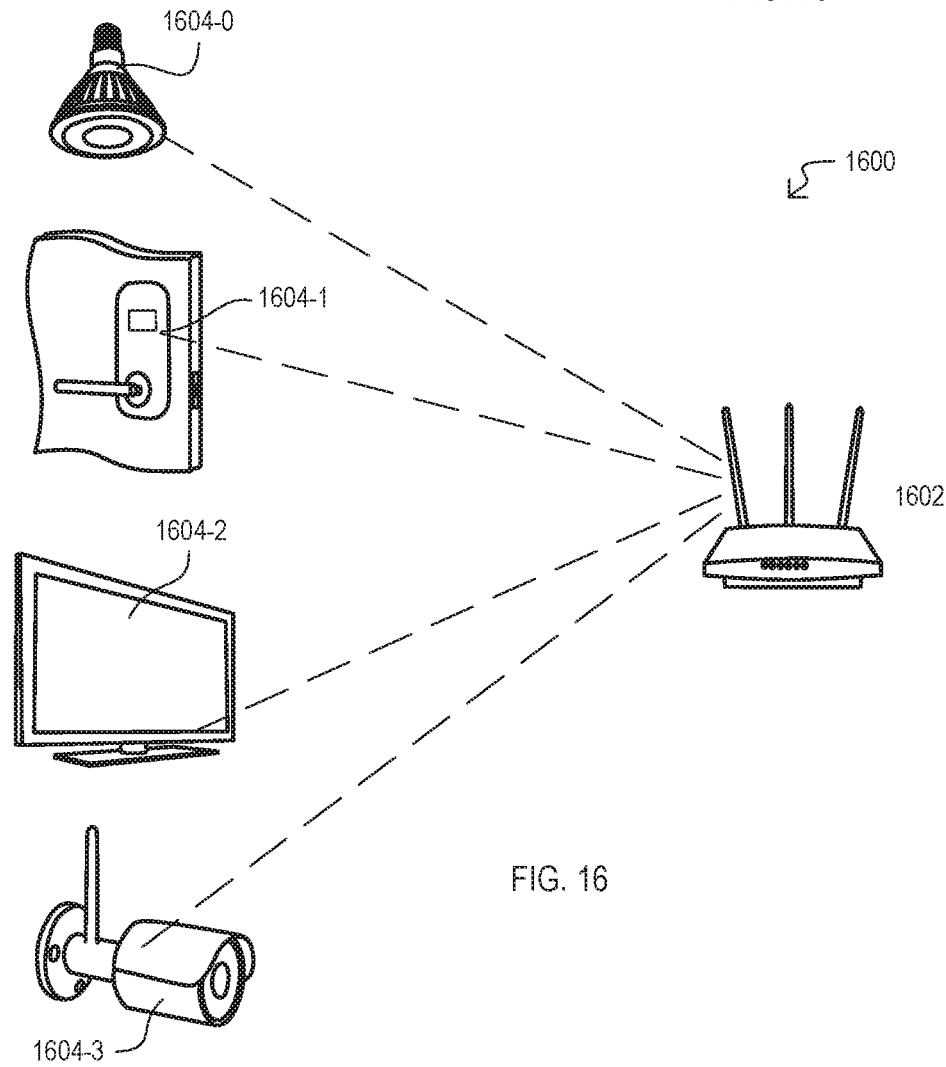
FIG. 16 is a diagram of a system according to another embodiment.

FIG. 16 shows a system 1600 according to another embodiment. A system 1600 can include various local devices 1604-0 to -3 and a gateway device 1602. Local devices (1604-0 to -3) can operate as station devices. In the embodiment shown, local devices can be Internet-of-things (IOT) type devices, such as home automation devices, including lighting devices 1604-0, locking devices 1604-1, entertainment devices 1604-2 and security devices 1604-3, as but a few of many possible examples.

Gateway device 1602 can include transmission modes that utilize one protocol that transmits over channels, and another protocol that transmits over narrow bands as described herein and equivalents. Such an arrangement can enable local devices (1604-0 to -3) to be in communication at longer ranges than conventional approaches by use of narrow band transmissions. Further, local devices (1604-0 to -3) can monitor narrow bands and utilize decoding techniques that can use repeated packets for more robust communications.

Embodiments herein can address imbalances in link budgets between a DL data path and an UL data path in conventional WiFi systems. In conventional WiFi systems, a station device on the UL does not have as much transmission power as compared to an AP on the DL. Therefore, the UL can be a bottleneck in achieving a balanced link between UL and DL. Embodiments can overcome this limitation by enabling a station device to use the same transmission power on the UL but in a narrower bandwidth channel and thereby effectively increasing the PSD. The increased PSD can result in a signal received at a station device being stronger (i.e., better SNR). With the increased SNR on the UL through a narrow band, as disclosed in embodiments herein, a more balanced WiFi system can be possible as compared to conventional approaches.

Hopping between narrow band channels, as described in the embodiments can result in various advantages. While conventional approaches, such as IEEE 802.11ax, can use RUs to share sub-bands of a larger bandwidth channel, such communications still include a wide band preamble (i.e., band wider than the narrow bands), which can have a smaller range than a narrow band signal (which can be transmitted at a higher PSD and/or repeat packet data).

By hopping between narrow bands (e.g., RUs), narrow bands which can suffer from a deep fade, can be avoided. Further, hopping between different narrow bands can be used to signal the best narrow bands from among multiple narrow bands.

As noted herein, embodiments can concentrate power within a smaller band width to increase PSD and range, as compared to a signals transmitted with the same PSD over larger bandwidths.

Embodiments herein can provide for more robust communication than conventional approaches, with increased PSD and/or repeated packet data. Repetition in time and frequency diversity can minimize loss, as compared to larger bandwidth communications.

As shown by embodiments herein, data blocks (e.g., packets) can be combined across repetition (time) and frequency to enable decoding of values at longer ranges.

While embodiments can execute channel communications according to any suitable protocol, in some embodiments such communications can be according to any suitable IEEE wireless standard, including but not limited to 802.11(a), 802.11(b), 802.11(g), 802.11(h), 802.11 (ac) and/or 802.11 (ax). Further, embodiments can transmit across channels of any suitable wireless communication band, including but not limited to a 2.4 GHz band, 5.0 GHz band and/or 6.0 GHz band. Channels can have any suitable bandwidth size, including about 5 MHz, 10 MHz, 20 MHz, 40 MHz, 80 MHz and 160 MHz, with narrow bands having a smaller bandwidth than their corresponding channel(s).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method, comprising:
   by operation of a first device, transmitting a preamble across a first channel according to a first communication protocol;
   by operation of the first device, for each of a plurality of narrow bands, transmitting a search message in one narrow band while not transmitting a search message in any other of the plurality of narrow bands until search messages have been transmitted in all of the plurality of narrow bands;
   by operation of the first device, monitoring the narrow bands for response communications returned in response to at least one search message; and
   upon detecting response communications on at least one of the narrow bands, establishing communications across at least one of the narrow bands; wherein
   the first channel includes a range of frequencies, and each narrow band is a different portion of the first channel, and there are no less than four narrow bands in the first channel.

2. The method of claim 1, wherein:
   the first communication protocol includes modulating a pseudorandom code value with data values.

3. The method of claim 1, wherein:
   transmitting the search messages in the plurality of narrow bands includes repeating a set of values in each narrow band.

4. The method of claim 1, wherein:
   transmitting the search messages in the plurality of narrow bands includes hopping between narrow bands over time.

5. The method of claim 4, wherein:
   hopping between the narrow bands includes hopping according to a predetermined sequence.

6. The method of claim 5, further including:
   determining the predetermined sequence from at least the response communications.

7. The method of claim 1, further including:
   determining which at least one narrow band to establish communications across from at least the response communications.

8. The method of claim 1, wherein:
   transmitting the preamble in the first channel includes transmitting at a first power spectral density (PSD); and
   transmitting the search messages in the plurality of narrow bands includes transmitting at a second PSD that is greater than the first PSD.

9. The method of claim 1, wherein:
   the search messages on the plurality of narrow bands comprise beacon packets.

10. A device, comprising:
    control circuits formed in an integrated circuit substrate and configured to generate a preamble according to a first communication protocol; and
    radio circuits formed in the integrated circuit substrate and configured to
       transmit the preamble across a first channel according to the first communication protocol,
       for each of a plurality of narrow bands, transmit a search messages in one narrow band while not transmitting a search message in any other of the plurality of narrow bands until search messages have been transmitted in all of the plurality of narrow bands,
    monitoring the narrow bands for response communications returned in response to at least one search message, and
    establishing communications across at least one of the narrow bands; wherein
    the first channel includes a predetermined range of frequencies, and each narrow band is a different portion of the first band, and there are no less than four narrow bands in the first channel.

11. The device of claim 10, wherein:
    the radio circuits are configured to transmit signal values in the plurality of narrow bands at a higher power spectral density (PSD) than that used to transmit the preamble.

12. The device of claim 10, further including:
    the control circuits are configured to control a hopping between narrow bands.

13. The device of claim 10, wherein:
    the communications across the at least one narrow band transmit data according to a protocol different than first communication protocol.

14. The device of claim 10, wherein:
    the radio circuits are configured to sequentially transmit the at least one message multiple times in a same narrow band.

15. The device of claim 10, wherein:
    the search messages on the plurality of narrow bands comprise beacon packets.

16. A system, comprising:
    at least a first device configured to
       transmit first discovery signals across a first channel and establish a communication connection according to a first protocol,
       for each of a plurality of narrow bands, transmit second discovery signals in one narrow band while not transmitting second discovery signals in any other of the plurality of narrow bands until second discovery signals have been transmitted in all of the plurality of narrow bands, each narrow band being a different portion of the first channel,
       monitoring the plurality of narrow bands for response signals returned in response to second discovery signals,
       designate at least one of the narrow bands as a transmission band in response to at least one response signal, and
       establish communications according to a second protocol across the at least one transmission band; wherein
    the first channel includes a predetermined range of frequencies, and the narrow bands are different portions of the first channel, and there are no less than four narrow bands in the first channel.

17. The system of claim 16, wherein:
    the first device is configured to transmit the second discovery signals at a greater power spectral density than the first discover signals.

18. The system of claim 16, wherein:
the first device is configured to, in response to failing to establish communications according to the first protocol, transmit the second discovery signals over the plurality of narrow bands.

19. The system of claim 16, further including:
a second device configured to
   monitor the narrow bands for signals, and
   transmit the response signals.

20. The system of claim 19, wherein:
the second device is further configured to
   decode packet data received on the narrow bands, and
   selectively reconstruct packet data with multiple sequential packets received on the same narrow band.

21. The system of claim 19, wherein:
the second device is further configured to switch between monitoring the narrow bands for signals and monitoring the first channel for signals.

22. The system of claim 19, wherein:
the second device is further configured to, in response to failing to establish a communication connection with the first device according to the first protocol, monitor the plurality of narrow bands.

23. The system of claim 16, wherein:
the second discovery signals on the plurality of narrow bands comprise beacon packets.

* * * * *